(No Model.)
A. BURGESS.
MAGAZINE FIRE ARM.
No. 250,880. Patented Dec. 13, 1881.
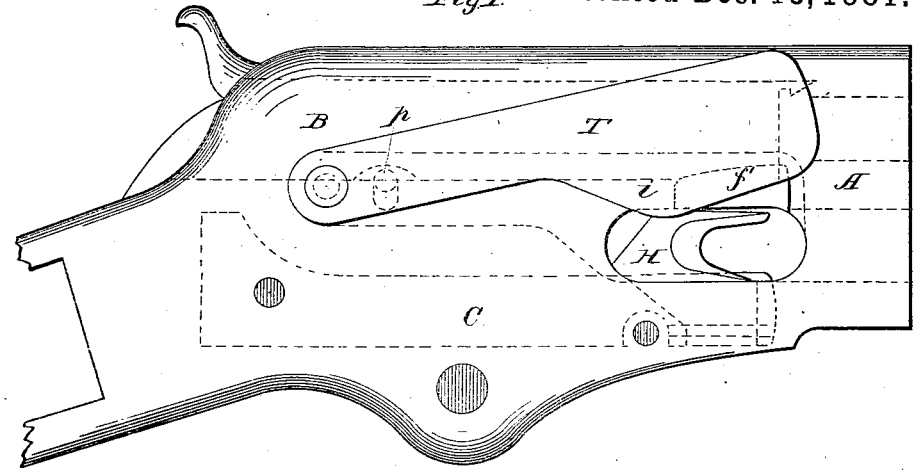
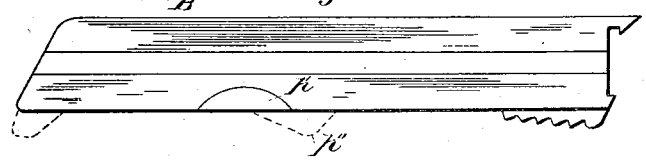
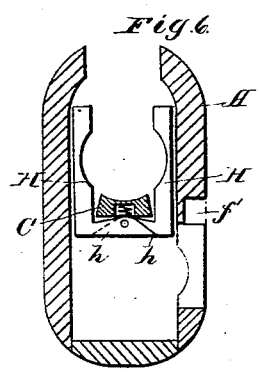
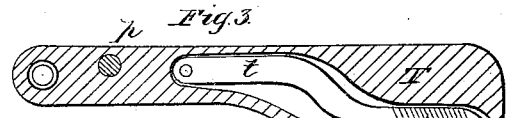
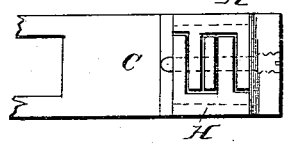
Witnesses:
J. R. Fralley
A. C. Stever
Inventor
Andrew Burgess

UNITED STATES PATENT OFFICE.

ANDREW BURGESS, OF OWEGO, NEW YORK.

MAGAZINE FIRE-ARM.

SPECIFICATION forming part of Letters Patent No. 250,880, dated December 13, 1881.

Application filed July 25, 1881. (No model.)

*To all whom it may concern:*

Be it known that I, ANDREW BURGESS, of Owego, in the county of Tioga and State of New York, have invented a new and useful Improvement in Magazine Fire-Arms, of which the following is a specification.

This invention relates, principally, to improvements in the loading-trap and carrier of magazine fire-arms; and it consists in the arrangement and combination of parts hereinafter more fully set forth and described.

In the accompanying drawings, Figure 1 represents a side elevation of the frame of an arm having my improvements partly shown in broken lines. Fig. 2 is a top view of the loading-trap detached. Fig. 3 shows a vertical longitudinal section of a modification of the loading-trap. Fig. 4 is a side elevation of a bolt. Fig. 5 shows the bottom of the carrier and retaining-hands. Fig. 6 is a vertical cross-section through the frame and carrier, to show their relation to the retaining-hands.

Similar letters of reference indicate corresponding parts.

A is the frame of the arm; B, the bolt; C, the carrier; T, the loading trap or cover; $p$, the pin or projection by which said trap is closed; $p'$, a shoulder or projection on the bolt for engaging said pin to close the trap, and $f$ is a projection on the trap to enter the loading-hole and prevent the lodging of cartridges. H H are hands pivoted to the carrier.

I pivot the loading trap or cover T to the frame, as shown in Fig. 1, and form it with an inclined side, $i$, so that the cartridge-point will strike said incline as it is forced toward the loading-hole, and so turn the trap T aside as to admit the free passage of the cartridges into the magazine; and to insure the closing of said trap or cover, I arrange a projection, $p$, thereon, which passes through the side of the frame to engage with a shoulder, $p'$ or $p''$, on the bolt when said bolt shall be moved, and thereby close said trap to cover the loading-aperture by positive force. The trap T has also a projection, $f$, which enters the loading-aperture when the trap is closed, to prevent the lodgment of cartridges therein, and when said trap is swung open the projection $f$ enters a cut-out in the side of the frame, as seen at $f'$, Fig. 1.

To operate the above-described loading-trap, press the first cartridge against the incline $i$, which turns the trap open, and by continuing the cartridge forward it enters the magazine, when the magazine may be filled in the same manner, the trap remaining open. Then by the movement of opening the breech the trap is closed over the opening, and if a cartridge-head should be lodged in the opening the projection $f$ forces it in, so that it may enter the frame and carrier.

By this device I avoid the force required to thrust the cartridges through a spring-trap and provide a positive automatic cover to the loading-aperture.

In the modified trap, Fig. 3, I arrange the projection $f$ (for entering the loading-aperture) on a swinging arm, $t$, which is pivoted in a hollow in the trap, so that it may not require so wide a cut-out on the frame at $f'$. I have also arranged the projection $f$ as a spring in the trap, to press outward when the trap is opened, in which case the cut-out $f'$ in the frame is dispensed with.

I so construct the carrier that its upper forward end consists of two hands. These hands interlock beneath the carrier, and are both pivoted to the bottom of said carrier by one pin or screw, as shown in Figs. 5 and 6, so the long upper projections of said hands will be forced to swing in toward each other, when they are forced up against the narrow part of the opening of the frame, near its top, as seen in Fig. 6. I have used the small spiral spring shown in Fig. 6 to close in the hands; but it may be omitted. The hands are opened, when the carrier is down, by the short arms $h\ h$ engaging the guard-strap at bottom of frame, so that the cartridge enters freely between them, and when the carrier, rising, raises the cartridge the arms are closed by the contracting frame, to grasp and hold the cartridge until it shall be forced forward so far that the bore or chamber of the barrel supports it. When the carrier is forced down by the closing breech the hands become free to open and release the cartridge, as soon as below the contracted part of the frame, that it may advance into the chamber.

In place of two pivoted hands or jaws on the carrier, one only may be used, to operate substantially the same; but I prefer both when the cartridges used have projecting flanges.

Having thus described my invention, what

I claim as new and useful, and desire to secure by Letters Patent, is—

1. The frame of a magazine fire-arm provided with a loading-aperture on its side, a pivoted loading trap or cover provided with a projection through the frame, in combination with a shoulder on the movable breech mechanism to close said trap, substantially as described.

2. In combination with the frame of a magazine-gun provided at the side with a loading-opening, and a lateral recess extending from said opening, an externally-pivoted cover provided with an inward projection, as $f$, which swings into said lateral recess when the opening is uncovered.

3. In a magazine fire-arm, a frame or receiver with upwardly-converging sides, in combination with a carrier provided at its forward end with one or more jaws, H $h$, the arms $h$ of said jaws arranged, as shown, to strike the bottom of the frame and spread the jaws when the carrier falls, and the converging sides serving to hold them together as the carrier rises, as and for the purpose set forth.

ANDREW BURGESS.

Witnesses:
D. O. HANCOCK,
L. H. MERCHANT.